US012696098B2

(12) United States Patent
Zhang et al.

(10) Patent No.: US 12,696,098 B2
(45) Date of Patent: Jul. 28, 2026

(54) MINING MOBILE COMMUNICATION SYSTEM AND METHOD

(71) Applicant: CCTEG CHINA COAL RESEARCH INSTITUTE, Beijing (CN)

(72) Inventors: Liya Zhang, Beijing (CN); Chenxin Li, Beijing (CN); Qingyong Meng, Beijing (CN); Wenzhen Wu, Beijing (CN); Liang Wen, Beijing (CN); Guowei Yang, Beijing (CN); Yufeng Jiang, Beijing (CN); Yuan Fu, Beijing (CN); Biao Li, Beijing (CN); Chunxian Wei, Beijing (CN); Kebing Wang, Beijing (CN); Yongwei Chen, Beijing (CN); Changjin Lian, Beijing (CN); Xuejun Zhang, Beijing (CN); Shouxin Kang, Beijing (CN); Zefang Li, Beijing (CN); Xiaodi Jia, Beijing (CN)

(73) Assignee: CCTEG China Coal Research Institute, Beijing (CN)

( * ) Notice: Subject to any disclaimer, the term of this patent is extended or adjusted under 35 U.S.C. 154(b) by 390 days.

(21) Appl. No.: 18/260,155

(22) PCT Filed: Feb. 7, 2023

(86) PCT No.: PCT/CN2023/074792
§ 371 (c)(1),
(2) Date: Jun. 30, 2023

(87) PCT Pub. No.: WO2023/216655
PCT Pub. Date: Nov. 16, 2023

(65) Prior Publication Data
US 2024/0381108 A1 Nov. 14, 2024

(30) Foreign Application Priority Data

May 12, 2022 (CN) .......................... 202210515350.6

(51) Int. Cl.
*H04W 16/14* (2009.01)
*H04W 4/30* (2018.01)

(52) U.S. Cl.
CPC ............. *H04W 16/14* (2013.01); *H04W 4/30* (2018.02)

(58) Field of Classification Search
CPC . H04L 9/50; H04L 9/0643; H04L 9/32; H04L 9/3239; H04L 63/0218; H04L 2209/56; G06Q 30/0222
See application file for complete search history.

(56) References Cited

U.S. PATENT DOCUMENTS 10,321,463 B1 * 6/2019 Ramasamy ......... H04W 72/542
2018/0109541 A1 * 4/2018 Gleichauf ............. H04W 12/06
(Continued)

FOREIGN PATENT DOCUMENTS

CN 208158898 U 11/2018
CN 112672427 A 4/2021
(Continued)

OTHER PUBLICATIONS

Search Report for corresponding EP application No. 23802431.9, dated Jul. 23, 2025 (8 pages).
(Continued)

*Primary Examiner* — Khalid W Shaheed
(74) *Attorney, Agent, or Firm* — Maginot, Moore & Beck, LLP

(57) ABSTRACT

A mining mobile communication system includes a first subsystem configured for communication in a licensed frequency band.

17 Claims, 3 Drawing Sheets

(56) References Cited

U.S. PATENT DOCUMENTS

| 2019/0281475 A1 | 9/2019 | Damnjanovic et al. | |
|---|---|---|---|
| 2021/0058970 A1* | 2/2021 | Kwak | H04W 72/23 |
| 2021/0352486 A1* | 11/2021 | Li | H04W 12/71 |
| 2024/0089744 A1* | 3/2024 | Fujishiro | H04W 24/02 |

FOREIGN PATENT DOCUMENTS

| CN | 114979942 A | 8/2022 |
|---|---|---|
| WO | 2021212265 A1 | 10/2021 |

OTHER PUBLICATIONS

Office Action for corresponding CN application No. 202210515350. 6, dated Oct. 10, 2022 (Chinese and English language documents) (42 pages).

International Search Report and Written Opinion for corresponding PCT application No. PCT/CN2023/074792, dated Apr. 17, 2023 (Chinese and English language documents) (16 pages).
Office Action for corresponding CN application No. 202310112922. 0, dated Sep. 26, 2023 (Chinese and English language documents) (26 pages).
OA for CN application 202210515350.6, dated Oct. 10, 2022.
English translation of OA for CN application 202210515350.6, dated Oct. 10, 2022.
ISR for PCT application PCT/CN2023/074792, dated Apr. 17, 2023.
English translation of ISR for PCT application PCT/CN2023/ 074792, dated Apr. 17, 2023.
Liya Zhang, "Research on mine integrated communication system," Industry and Mine Automation, Mar. 2018, vol. 44, No. 3.
OA for CN application 202310112922.0, dated Sep. 26, 2023.
English translation of OA for CN application 202310112922.0, dated Sep. 26, 2023.

* cited by examiner adopting a first subsystem for communication in a licensed frequency band

MINING MOBILE COMMUNICATION SYSTEM AND METHOD

CROSS-REFERENCE TO RELATED APPLICATION

The present application is a National Stage Application under 35 USC § 371 of International Application PCT/CN2023/074792, filed on Feb. 7, 2023, which claims priority to and benefits of the Chinese Patent Application No. 202210515350.6, filed on May 12, 2022, the entire contents of which are incorporated herein by reference.

FIELD

The present disclosure relates to the field of mobile communication technologies, and especially to a mining mobile communication system and a mining mobile communication method.

BACKGROUND

With the gradual development of coal mine safety production situation, technical development of coal mine production begins to develop from mechanization and automation to intelligence in order to realize safer and more efficient coal mine production. The mining and transportation of coal mines are also developing in a direction of less-manned and unmanned. A mining communication system has become a basic supporting technology for the intelligent development of coal mines. In the related art, the mining communication system is mainly used as a channel for information transmission. At the same time, a transmission efficiency of the mining communication system is seriously limited, due to a special working environment of the mining communication system as well as limited by a limited transmission rate, latency and reliability of a traditional communication system.

SUMMARY

A first aspect of the present disclosure provides a mine mobile communication system. The mining mobile communication system includes a first subsystem configured for communication in a licensed frequency band.

A second aspect of the present disclosure provides a mining mobile communication method. The mining mobile communication method includes adopting a first subsystem for communication in a licensed frequency band.

A third aspect of the present disclosure provides an electronic device. The electronic device includes a processor; and a memory for storing instructions executable by the processor; in which the processor is configured to execute the instructions to implement the mining mobile communication method according to embodiments of the second aspect of the present disclosure.

Additional aspects and advantages of the present disclosure will be set forth, in part, in the following description, and in part will be apparent from the following description, or learned by practice of the present disclosure.

BRIEF DESCRIPTION OF THE DRAWINGS

The above-mentioned and/or additional aspects and advantages of the present disclosure will be apparent and readily understood from the following description of embodiments taken in conjunction with the accompanying drawings.

FIG. 5 is a flow chart showing a mining mobile communication method provided in an embodiment of the present disclosure.

DETAILED DESCRIPTION

Figure 1:
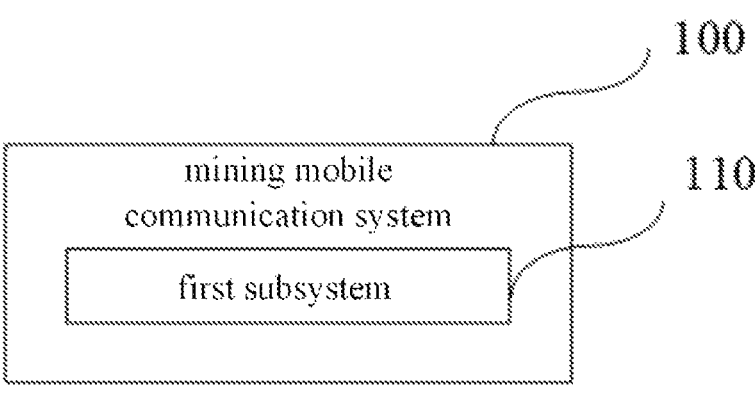
FIG. 1 is a schematic diagram showing a first mining mobile communication system provided in an embodiment of the present disclosure.

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are only used to explain the present disclosure and cannot be construed as limiting the present disclosure. On the contrary, the embodiments of the present application include all changes, modifications and equivalents that fall within the spirit and connotation of the appended claims.

In the related art, at present, a mining mobile communication system is mainly a $4^{th}$ generation (4G) mobile communication system, and wireless fidelity (WiFi). A positioning system mainly includes Zigbee and an ultra wide band (UWB). A mine communication system also includes a digital broadcasting system, etc. A current mainstream system operation mode is that each system works independently.

It is easy to understand that the mining mobile communication system in the related art still mainly adopts a long term evolution (LTE) technology, namely 4G, in a licensed frequency. A transmission rate, transmission latency, and reliability of 4G cannot support transmission requirements under a complex heterogeneous multi-system architecture of intelligent construction of coal mines. Moreover, a main communication technology is WiFi in an unlicensed frequency of the mining mobile communication system. On the one hand, positioning technologies such as the UWB and Zigbee operate independently, separate from the mobile communication system and are difficult to fuse. At the same time, they are all wireless positioning technologies for an unlicensed spectrum, and the real-time and reliability for positioning are difficult to improve due to the limitation of an unlicensed frequency.

In addition, with the development of a new generation mobile communication technology, the $5^{th}$ generation (5G) mobile communication technology with a large bandwidth, low latency and high reliability has become a mainstream technology of the next generation public telecommunication network communication. A 5G mobile communication system has also potentially become an advanced alternative technology for intelligent development of coal mines.

However, an application environment of the mining mobile communication system is different from a conventional public telecommunication network, and has the following remarkable characteristics.

(1): The mining mobile communication system needs to take into account dual transmission requirements of the uphole and underground of the coal mines.

(2): An uphole transmission of the mining communication system needs to fully consider requirements of device resource allocation and data management under different levels of management in the mine to carry out a targeted design.

(3): An underground transmission of the coal mining communication system needs to consider the following issues.

a): Underground signals of the coal mines need to cover a roadway with a length of more than 10 kilometers. An underground roadway is a limited space of strip-shaped and band-shaped distribution, and a multipath effect of a signal transmission is significant.

b): Interference factors of a wireless signal transmission are complex, and the communication network needs to have strong anti-interference ability.

c): There are combustible gases such as gas in the underground of the coal mines, and a device needs to be designed for explosion-proof, and explosion-proof performance is assessed according to a maximum total power of a transmitting antenna.

d): According to actual requirements of various monitoring data and audio-video data transmission, the resource requirements of the mine communication network for an uplink transmission are more significant, while requirements of a traditional public telecommunication network for a downlink transmission are significant.

In addition to the above-mentioned common technical problems, under urgent requirements of the intelligent development of the coal mines and a clear goal of less-manned and unmanned mine construction, the mining mobile communication system should not simply solve a problem of an information transmission channel, but also need to carry out a targeted design for requirements of less-manned and unmanned applications, which mainly includes as follows.

(1): In addition to information communication functions, it is necessary to have synaesthesia fusion functions represented by positioning at the same time, such as supporting automatic driving of vehicles.

(2): It is necessary to realize the fusion of subsystems such as a voice communication, a data transmission, a scheduling communication, a broadcast communication, a positioning application and a control application, etc., and realize the interconnection and linkage control of various underground systems in the coal mines, such as supporting automatic control of working face device, etc. At the same time, it is also necessary to consider the realization of efficient linkage control with low latency between multiple systems.

However, in an actual construction process of the mine, there are also exist the following practical technical problems.

(1): For upgrading and reconstruction projects, there will be existing a wired communication system, a positioning system and the like in the coal mines, and compatibility and interoperability between the subsystems need to be considered.

(2): For a new project, if it is a centralized construction, it may realize overall planning and unified construction. If it is a single system independent construction, it is still necessary to consider the compatibility between the subsystems.

Therefore, according to actual situation differences in system deployment, the mining mobile communication system needs to provide a targeted system architecture to fully meet actual requirements of mine site construction.

The present disclosure will be described in detail below with reference to specific embodiments.

FIG. 1 is a schematic diagram showing a first mining mobile communication system provided in an embodiment of the present disclosure.

As shown in FIG. 1, a first mining mobile communication system 100 provided in an embodiment of the present disclosure includes a first subsystem 110.

The first subsystem 110 is configured for communication in a licensed frequency band.

According to some embodiments, the first subsystem 110 does not specifically refer to a fixed subsystem. The first subsystem 110 includes, but is not limited to 5G, 6G and evolved wireless communication systems thereof. For example, the first subsystem 110 may be a 5G new radio (NR) communication system. The first subsystem 110 may also be a 6G communication system.

It is easy to understand that 5G, 6G and evolved wireless communication technologies thereof may be adopted to replace a LTE technology by adopting the first subsystem 110 configured for communication in the licensed frequency band in the present disclosure. Furthermore, a transmission rate, transmission latency and reliability of the mining mobile communication system may be improved, so as to meet transmission requirements under a complex heterogeneous multi-system architecture of intelligent construction of coal mines.

Figure 2:
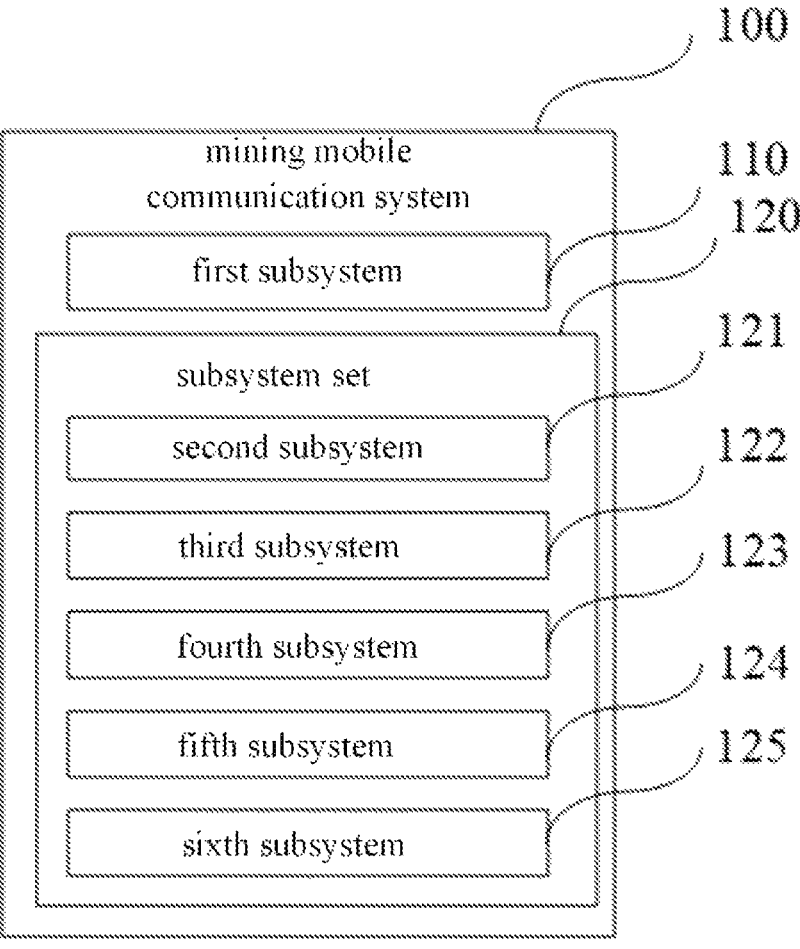
FIG. 2 is a schematic diagram showing a second mining mobile communication system provided in an embodiment of the present disclosure.

In an embodiment of the present disclosure, FIG. 2 is a schematic diagram showing a second mining mobile communication system provided in an embodiment of the present disclosure. As shown in FIG. 2, the mining mobile communication system 100 further includes at least one of a subsystem set 120. The subsystem set includes a second subsystem 121, a third subsystem 122, a fourth subsystem 123, a fifth subsystem 124 and a sixth subsystem 125.

The second subsystem 121 is configured for communication in an unlicensed frequency band.

The third subsystem 122 is configured for positioning.

The fourth subsystem 123 is configured for sidelink communication.

The fifth subsystem 124 is configured for broadcast communication.

The sixth subsystem 125 is configured for wireless communication in a licensed frequency band outside the licensed frequency band of the first subsystem.

According to some embodiments, the sixth subsystem 125 does not specifically refer to a fixed subsystem. The sixth subsystem 125 includes, but is not limited to a long term evolution (LTE) communication system, a NR communication system, a 3G communication system, and the like.

In some embodiments, a system type of the sixth subsystem 125 is different from that of the first subsystem 110. For example, the first subsystem 110 is a NR communication system and the sixth subsystem 125 is a LTE communication system. Alternatively, the first subsystem 110 is a 6G communication system and the sixth subsystem 125 is a NR communication system. Alternatively, the first subsystem 110 is a 6G communication system and the sixth subsystem 125 is a LTE communication system.

In an embodiment of the present disclosure, the mining mobile communication system performs networking according to an adopted architecture being any one of a data plane fusion architecture, a control plane fusion architecture, or a hybrid fusion architecture.

According to some embodiments, the data plane fusion architecture refers to a design architecture suitable for reconstructing and adding the first subsystem 110 on the basis of an existing communication subsystem. When the mining mobile communication system adopts the data plane fusion architecture, each subsystem performs data protocol conversion and data interaction at a platform side. The wireless communication network supporting a large bandwidth, low latency and high reliability may be provided based on the mining mobile communication system to the maximum extent.

According to some embodiments, the control plane fusion architecture, also referred to as a system architecture under a single $3^{rd}$ generation partnership project (3GPP) technical system, refers to an architecture suitable for an overall new design of the mining mobile communication system. All subsystems of the mining mobile communication system under the control plane fusion architecture are all based on a cellular technology.

In some embodiments, the control plane fusion architecture adopts a single 3GPP technical system (a single cellular technology system) to construct a mining mobile communication system with control panel fusion, which may solve technical problems that functions of heterogeneous systems are fixed as well as carrier channels and functions cannot be dynamically adjusted according to an actual service transmission situation. Resource scheduling and service diverting based on a dynamic load and a service priority may be realize.

According to some embodiments, the hybrid fusion architecture refers to an architecture composed of the data plane fusion architecture and the control plane fusion architecture. The hybrid fusion architecture is suitable for at least one subsystem of a new first subsystem 110 and a new subsystem set 120, but is still based on a design architecture of at least one other subsystem. The mining mobile communication system may realize a flexible expansion of a mine mobile communication network and may realize an on-demand design and configuration of a service transmission load and a transmission channel by adopting the hybrid fusion architecture.

It is easy to understand that, by taking the first subsystem 110 as a core subsystem, the present disclosure provides three system architectures fusing communication, positioning, scheduling and control, etc. for different construction requirements and technical routes, which may solve problems of independent and heterogeneous of a mine mobile communication system construction system, significant differences in construction requirements, low cohesion of technology integration, and the like.

In an embodiment of the present disclosure, when the mining mobile communication system adopts the data plane fusion architecture, the mining mobile communication system 100 includes the first subsystem 110 and the at least one of the subsystem set 120. A technology adopted by the second subsystem 121 includes at least one of first technologies for the second subsystem, and the first technologies for the second subsystem are technologies for a non-cellular technology system and include a WiFi technology based on a time division multiplexing (TDM) mode, a WiFi technology based on orthogonal frequency division multiplexing (OFDMA), a Bluetooth technology, and a SparkLink wireless communication technology. A technology adopted by the third subsystem 122 includes at least one of first technologies for the third subsystem, and the first technologies for the third subsystem are technologies for a non-cellular technology system and include an ultra wide band (UWB) technology, a Zigbee technology, a sensing technology, and a radio frequency identification (RFID) technology. A technology adopted by the fourth subsystem 123 includes at least one of first technologies for the fourth subsystem, and the first technologies for the fourth subsystem are technologies for a non-cellular technology system and include a WiFi technology, and a wireless intercom technology. A technology adopted by the fifth subsystem 124 is a first technology for the fifth subsystem, and the first technology for the fifth subsystem is a technology for a non-cellular technology system and includes a digital cable broadcasting communication technology.

According to some embodiments, when the second subsystem 121 adopts the SparkLink wireless communication technology, the second subsystem 121 is an unlicensed frequency band wireless communication subsystem based on a SparkLink wireless communication system. Aiming at requirements of low latency and high reliability of equipment control in a coal mine underground working face, and in combination with a relatively fixed position or a relatively fixed moving range of a device in the coal mine underground working face, the unlicensed frequency band wireless communication subsystem based on the SparkLink wireless communication system is adopted, which may reduce the latency of a short-distance wireless communication of a specific working face and improve the reliability of a short-distance wireless communication of a specific working face.

In an embodiment of the present disclosure, when the mining mobile communication system adopts the control plane fusion architecture, the mining mobile communication system 100 includes the first subsystem 110 and the at least one of the subsystem set 120, and technologies adopted by all subsystems are technologies for cellular systems.

A technology adopted by the second subsystem 121 includes at least one of second technologies for the second subsystem, and the second technologies for the second subsystem are technologies for a cellular technology system and include a new radio access technology in an unlicensed frequency band (NR-U), and an unlicensed access technology for a sidelink communication (sidelink-U).

A technology adopted by the third subsystem 122 includes at least one of second technologies for the third subsystem, and the second technologies for the third subsystem are technologies for a cellular technology system and include a NR positioning technology, and a positioning technology based on a cellular sidelink communication.

A technology adopted by the fourth subsystem 123 is second technologies for the fourth subsystem, and the second technologies for the fourth subsystem are technologies for a cellular technology system and include a LTE sidelink communication technology, and a NR sidelink communication technology.

A technology adopted by the fifth subsystem 124 is second technologies for the fifth subsystem, and the second technologies for the fifth subsystem are technologies for a cellular technology system and include cellular multimedia broadcast multicast services (MBSs).

According to some embodiments, the cellular technology (the technologies for cellular systems) refers to a technology in which a terminal and a network device are connected through a wireless channel in a cellular wireless networking manner, thus enabling users to communicate with each other during activities. In the related art, the cellular technology may be used in the Internet of Vehicles and public safety services. For services related to the Internet of Vehicles and automatic driving, a special frequency band for intelligent transportation may be used.

In some embodiments, since wireless communication requirements of the underground coal mines are significantly different from those of the ground field, video monitoring of the underground coal mines, and uploading of various types of sensor data require a large proportion of an uplink bandwidth. However, in the ground field, downlink transmission is dominant. Therefore, with regard to a long-distance remote control driving service that may be carried by an uplink and a downlink of a cellular on the ground, due to the serious shortage of uplink resources in the underground coal mines, by using the sidelink communication technology based on the cellular technology system, uplink resources in the underground coal mines may be carried based on the sidelink communication, and the significant requirements of specific uplink resources in the underground coal mines may be alleviated.

In an embodiment of the present disclosure, when the mining mobile communication system adopts the hybrid fusion architecture, the mining mobile communication 100 includes the first subsystem 110 and the at least one of the subsystem set 120. A technology adopted by the second subsystem 121 is at least one of a first technology for the second subsystem and a second technology for the second subsystem, and the first technology for the second subsystem is a technology for a non-cellular technology system and includes a WiFi technology based on a TDM mode, a WiFi technology based on OFDMA, a Bluetooth technology, and a SparkLink wireless communication technology, and the second technology for the second subsystem is a technology for a cellular technology system and includes a NR-U and a Sidelink-U. A technology adopted by the third subsystem 122 is at least one of a first technology for the third subsystem and a second technology for the third subsystem, and the first technology for the third subsystem is a technology for a non-cellular technology system and includes a UWB technology, a Zigbee technology, a sensing technology, and a RFID technology, and the second technology for the third subsystem is a technology for a cellular technology system and includes a NR positioning technology, and a positioning technology based on a cellular sidelink communication. A technology adopted by the fourth subsystem 123 is at least one of a first technology for the fourth subsystem and a second technology for the fourth subsystem, and the first technology for the fourth subsystem is a technology for a non-cellular technology system and includes a WiFi technology, and a wireless intercom technology, and the second technology for the fourth subsystem is a technology for a cellular technology system and includes a LTE sidelink communication technology, and a NR sidelink communication technology. A technology adopted by the fifth subsystem 124 is at least one of a first technology for the fifth subsystem and a second technology for the fifth subsystem, and the first technology for the fifth subsystem is a technology for a non-cellular technology system and includes a digital cable broadcast communication technology, and the second technology for the fifth subsystem is a technology for a cellular technology system and includes cellular multimedia broadcast multicast services (MBSs). Subsystems of the mining mobile communication system 110 adopt at least one of the first technology for the second subsystem, the first technology for the third subsystem, the first technology for the fourth subsystem and the first technology for the fifth subsystem, and adopt at least one of the second technology for the second subsystem, the second technology for the third subsystem, the second technology for the fourth subsystem and the second technology for the fifth subsystem.

Figure 3:
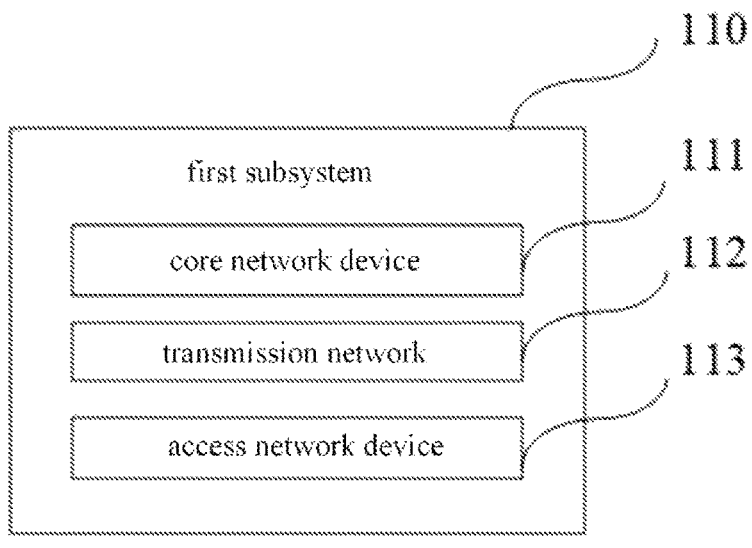
FIG. 3 is a schematic diagram showing a first subsystem provided in an embodiment of the present disclosure.

In an embodiment of the present disclosure, FIG. 3 is a schematic diagram showing a first subsystem provided in an embodiment of the present disclosure. As shown in FIG. 3, the first subsystem 110 includes a core network device 111, a transmission network 112, and an access network device 113.

In an embodiment of the present disclosure, a deployment architecture of the core network device is any one of a core network server being deployed in a device room of a first level, and a user plane function (UPF) being deployed in a device room of a second level, both a core network server and a UPF being deployed in a device room of a first level, or both a core network server and a UPF being deployed in a device room of a second level, in which the device room of the first level connects and manages a plurality of device rooms of the second level, and the device room of the second level is a device room that merely connects and manages a single mine underground transmission network and a single access network device.

According to some embodiments, by adopting an architecture of the core network servers sharing and the UPF sinking, the present disclosure may realize core network server device resource sharing and resource dynamic allocation. At the same time, according to the specific requirements of information security management, the coal mines/mine may deploy a security policy at a sunken UPF side. At the same time, the security management of data and diverting according to a policy are realized. Part of the data may merely be transmitted in an internal network, and part of the data may be accessed to a public network for communication.

In an embodiment of the present disclosure, the access network device includes a base station device and a terminal device, or includes a base station device, a terminal device and a reconfigurable intelligent hypersurface device. The access network device is configured to use at least one licensed frequency band for data transmission.

According to some embodiments, the licensed frequency band includes, but is not limited to 700 MHz frequency band range (703 to 748 MHz and/or 758 to 803 MHz), 900 MHz frequency band range (880 to 915 MHz and/or 925 to 960 MHz), 2.6 GHz frequency band range (2515 to 2615 MHz and/or 2615 to 2675 mhz), 3.3 GHz frequency band range (3300 to 3400 MHz), 3.5 GHz frequency band range (2400 to 3500 MHz and/or 3500 to 3600 MHz), 4.9 GHz frequency band range (4800 to 4900 MHz and/or 4900 to 5000 MHz).

In an embodiment of the present disclosure, the base station device includes a baseband processing unit, a radio remote unit, or includes a baseband processing unit, a radio remote unit, and a hub.

In an embodiment of the present disclosure, the terminal device includes at least one of a handheld terminal, a vehicle terminal, a customer premise device (CPE), a reduced capability (RedCap) terminal, or a sensor with a wireless transmission function.

According to some embodiments, the sensor with the wireless transmission function does not specifically refer to a fixed sensor. The sensor with the wireless transmission function includes, but is not limited to a camera, an environmental parameter monitoring sensor, a lidar, a millimeter wave radar, a disaster monitoring sensor, and the like.

Figure 4:
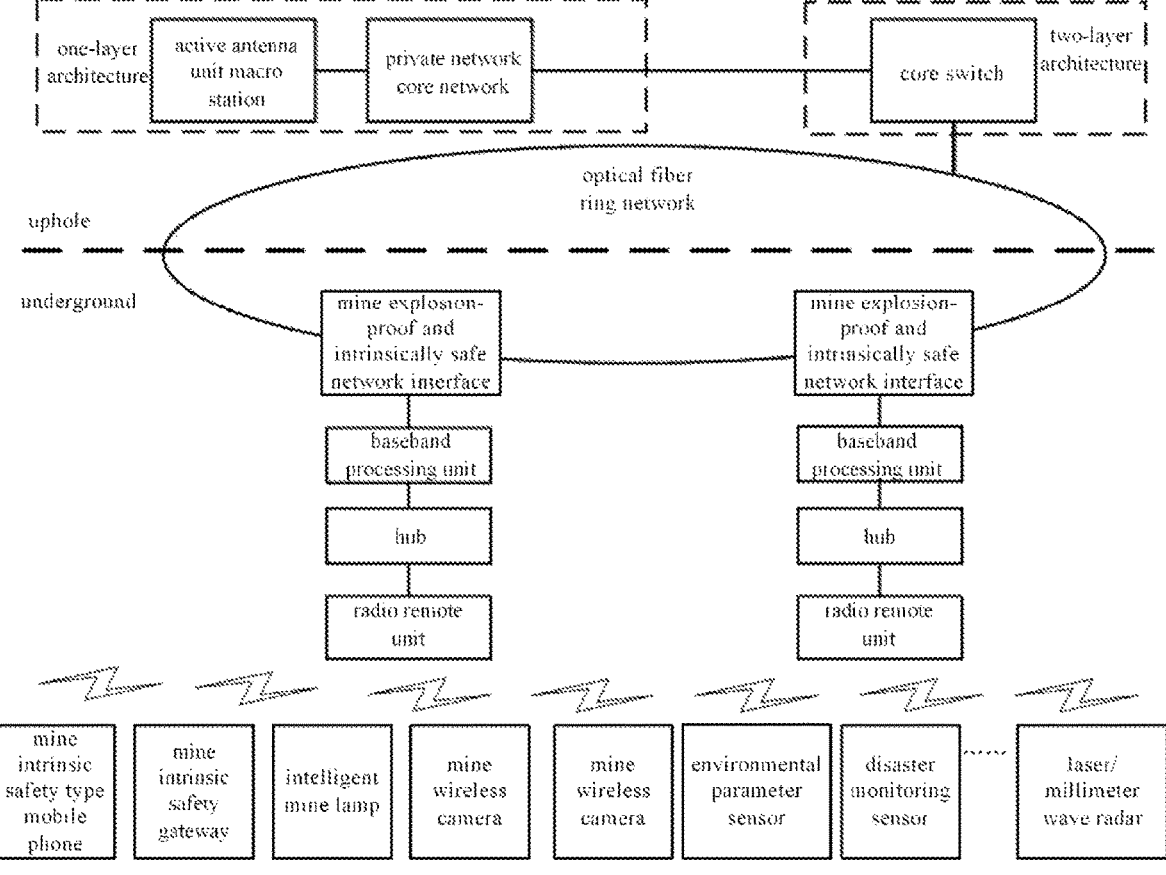
FIG. 4 is an architecture diagram showing a first subsystem provided in an embodiment of the present disclosure.

According to some embodiments, FIG. 4 is an architecture diagram showing a first subsystem provided in an embodiment of the present disclosure. As shown in FIG. 4, a one-layer architecture of the first subsystem 110 includes an active antenna unit (AAU) macro station and a core network server. A two-layer architecture of the first subsystem 110 is a core switch of the UPF. An access network device in the underground is connected to the two-layer architecture through a mine explosion-proof and intrinsically safe network interface and an optical fiber ring network. The access network device includes a baseband processing unit, a radio remote unit, and a hub. The terminal device includes a mine intrinsic safety type mobile phone, a mine intrinsic safety gateway, an intelligent mine lamp, a mine wireless camera, a mine wireless camera, an environmental parameter sensor, a disaster monitoring sensor, and a laser/millimeter wave radar.

In an embodiment of the present disclosure, the access network device is configured to use at least one first frequency band for data transmission or at least one second frequency band for data transmission in an area with a coverage enhancement requirement, in which the first frequency band is a frequency band less than or equal to a pre-configured frequency threshold, and the second frequency band is a combination of the first frequency band and a third frequency band, and a frequency band of the first frequency band and a frequency band of the third frequency band are different.

According to some embodiments, the second frequency band includes, but is not limited to a combination of n28 (700 MHz FDD)+n41 (2.6 GHz), n83 (700 MHz SUL)+n41 (2.6 GHz), n28 (700 MHz FDD)+n79 (4.9 GHz), n83 (700 MHz SUL)+n79 (4.9 GHz), n8 (900 MHz FDD)+n78 (3.5 GHz), n81 (900 MHz SUL)+n78 (3.5 GHz).

It is easy to understand that, due to a limited space of strip-shaped and band-shaped distribution in the underground coal mines, the multipath effect is significant. Moreover, since there are many facilities and devices, signal attenuation of the wireless signal transmission is serious. Therefore, by adopting the at least one second frequency band for data transmission, the present disclosure may target the mechanism of mine electromagnetic wave transmission. The lower the frequency band of the second frequency band is, the greater the coverage distance is, and a frequency band which is less than or equal to the preset frequency value threshold is adopted, and the limitation may have an effect of coverage enhancement.

It is easy to understand that in the related art, a transmission power of the terminal does not exceed 23 dBm, while a transmission power of a pico remote reset unit (pRRU) pico base station may reach 26 dBm or 33 dBm. A transmission power of the uplink is relatively low, so the coverage enhancement needs to focus on the uplink. Therefore, in the present disclosure, by adopting the at least one second frequency band for data transmission, on the one hand, the uplink of the underground coal mines may be enhanced, and the frequency band less than or equal to the pre-configured frequency threshold may be used. The downlink may also use a frequency band greater than or equal to the pre-configured frequency threshold to provide a larger bandwidth, which may simultaneously realize effects of coverage enhancement in the uplink, a large bandwidth in the downlink, and no significant increase in device capacity and cost.

In an embodiment of the present disclosure, the access network device is configured to use at least one first frequency band for data transmission or at least one second frequency band for data transmission, and a trigger condition is determined based on first information, in which the first information includes at least one of underground environment information, an underground base station layout parameter, and underground wireless environment status information. When the first information is the underground environment information, the trigger condition is a working environment of the mining mobile communication system being located in a first area, or the mining mobile communication system transmitting system disaster warning information, environmental parameter warning information, or emergency evacuation information. When the first information is the underground station layout parameter, the trigger condition is an underground station layout distance being greater than or equal to a preset threshold. When the first information is the underground wireless environment status information, the trigger condition includes at least one of reaching or exceeding a preset duration threshold, and no synchronization signal or system information being searched, reaching or exceeding a preset number of times, random access being not successfully completed, or a radio resource control (RRC) parameter being not acquired, within a preset length of time, a proportion of a number of times reference signal receiving power (RSRP) of a signal transmission is lower than or equal to a preset RSRP threshold reaching or exceeding a preset proportion, or a ratio of a number of times a signal to interference plus noise ratio (SINR) of a signal transmission is lower than or equal to a preset SINR threshold reaching or exceeding a preset ratio, or within a preset time or a preset number of transmissions, a counting value of a transmission number evaluation counter reaching a preset value, and the transmission number evaluation counter being configured to evaluate a status of the underground wireless environment according to a number of times of reception of a negative-acknowledgment (NACK) or a number of times of retransmission by a transmission block of a same service or a code block group of a same service.

According to some embodiments, the first area does not specifically refer to a fixed area. The first area includes, but is not limited to a coal mining working area, a tunneling working area, an area with control application requirements, and the like.

It is easy to understand that since the first frequency band is relatively scarce, the access network device uses the at least one first frequency band for data transmission or the at least one second frequency band for data transmission by adopting a trigger condition provided by the present disclosure. The first frequency band may be configured for transmission as required according to an actual demand of coverage enhancement in the underground coal mines.

In an embodiment of the present disclosure, the transmission number evaluation counter being configured to evaluate the status of the underground wireless environment according to the number of times of reception of the NACK or the number of times of retransmission by the transmission block of the same service or the code block group of the same service is specifically adding a transmission number evaluation indication field in reserved bits of a physical layer signaling or high layer signaling of the mining mobile communication system to indicate that it is currently required to start the transmission number evaluation, the transmission number evaluation indication field indicating that one transmission number evaluation is currently started, and a transmission number evaluation count value being randomly generated within a preset numerical range, and current transmission number evaluation time being randomly generated within a preset time range when meeting at least one of the network side indicating to start one transmission number evaluation, a time for which a transmission is not performed by using the first frequency band or the second frequency band reaching or exceeding a preset duration, a time from a starting time of a last transmission number evaluation reaching or exceeding last randomly generated transmission number evaluation time, a random number of a transmission number evaluation which is not performed currently, a transmission being about to be performed and a randomly generated transmission number evaluation being within a random number interval that determines to perform the transmission number evaluation, or a count value of the transmission number evaluation counter reaching a preset value, after the transmission number evaluation is started, in response to determining that the number of transmissions meets a preset condition, the count value of the transmission number evaluation counter being subtracted by one, and the preset condition being a transmission block of a service packet or a code block group of a service packet receiving the NACK for a preset number of times, or retransmitting for a preset number of times.

It is easy to understand that when transmission blocks of multiple service packets reach a certain number of transmissions, or the number of transmissions of a code block group reach a certain number of transmissions, it may be considered that there is a certain problem in the quality of signal coverage, thus transmission performance is evaluated. However, a multipath environment under the mine is significant, and random occurrence of occlusion factors have a certain probability. It is necessary to consider the dual identification of randomness and certainty, so as to avoid frequent frequency band switching, resulting in system performance degradation or congestion in the first frequency band. Therefore, by further designing an evaluation method of "randomness+certainty" and "an evaluation time period/ the number of transmissions+judgment basis", the present disclosure may simultaneously solve the dual identification requirements of randomness and certainty unique to a special environment under the mine.

In an embodiment of the present disclosure, the first subsystem 110, the third subsystem 122, and the fourth subsystem 123 each include a network side device and a terminal device in response to determining that technologies adopted by the third subsystem 122 and the fourth subsystem 123 are both cellular system technologies. A deployment mode of the network side device of the first subsystem 110, the network side device of the third subsystem 122, and the network side device of the fourth subsystem 123 is the network side device of the third subsystem 122, the network side device of the fourth subsystem 123, and the network side device of the first subsystem 110 being deployed in a same physical entity, and a logical entity of the network side device of the third subsystem 122, a logical entity of the network side device of the fourth subsystem 123, and a logical entity of the network side device of the first subsystem 110 being independent. A deployment mode of the terminal device of the first subsystem 110, the terminal device of the third subsystem 122, and the terminal device of the fourth subsystem 123 is any one of at least two of the terminal device of the third subsystem 122, the terminal device of the fourth subsystem 123 and the terminal device of the first subsystem 110 being deployed in a same physical entity, and a logical entity of the terminal device of the third subsystem 122, a logical entity of the terminal device of the fourth subsystem 123 and a logical entity of the terminal device of the first subsystem 110 being independent, or physical and logical entities of the terminal device of the third subsystem 122, the terminal device of the fourth subsystem 123, and the terminal device of the first subsystem 122 being independent.

It is easy to understand that heterogeneous systems cannot realize problems of efficient and accurate adaptation of different functions and application data, and cannot achieve efficient and coordinated linkage control. Therefore, the present disclosure may support the decoupling of different functions by realizing the logical entities of the third subsystem 122 and the fourth subsystem 123 being independent, thus establishing a system architecture with high cohesion and low coupling.

In an embodiment of the present disclosure, the first subsystem 110, the second subsystem 121, and the fifth subsystem 124 each include a network side device and a terminal device in response to determining that technologies adopted by the second subsystem 121 and the fifth subsystem 124 are both cellular system technologies. A deployment mode of the network side device of the first subsystem 110, the network side device of the second subsystem 121, and the network side device of the fifth subsystem 124 is any one of the network side device of the second subsystem 121, the network side device of the fifth subsystem 124, and the network side device of the first subsystem 110 being deployed in a same physical entity, and a logical entity of the network side device of the second subsystem 121, a logical entity of the network side device of the fifth subsystem 124, and a logical entity of the network side device of the first subsystem 110 being independent, or the network side device of the second subsystem 121, the network side device of the fifth subsystem 124, and the network side device of the first subsystem 110 being deployed in a same physical entity, and a logical entity of the network side device of the second subsystem 121, a logical entity of the network side device of the fifth subsystem 124, and a logical entity of the network side device of the first subsystem 110 being a same logical entity. A deployment mode of the terminal device of the first subsystem 110, the terminal device of the second subsystem 121, and the terminal device of the fifth subsystem 124 is any one of the terminal device of the second subsystem 121, the terminal device of the fifth subsystem 124, and the terminal device of the first subsystem 110 being deployed in a same physical entity, and a logical entity of the terminal device of the second subsystem 121, a logical entity of the terminal device of the fifth subsystem 124, and a logical entity of the terminal device of the first subsystem 110 being independent, a physical entity of the terminal device of the second subsystem 121, a physical entity of the terminal device of the fifth subsystem 124, and a physical entity of the terminal device of the first subsystem 110 being independent, and a logical entity of the terminal device of the second subsystem 121, a logical entity of the terminal device of the fifth subsystem 124, and a logical entity of the terminal device of the first subsystem 110 being independent, or the terminal device of the second subsystem 121, the terminal device of the fifth subsystem 124, and the terminal device of the first subsystem 110 being deployed in a same physical entity, and a logical entity of the terminal device of the second subsystem 121, a logical entity of the terminal device of the fifth subsystem 124, and a logical entity of the terminal device of the first subsystem 110 being a same logical entity.

According to some embodiments, the network side device of the first subsystem 110, the network side device of the second subsystem 121, the network side device of the third subsystem 122, the network side device of the fourth subsystem 123, and the network side device of the fifth subsystem 124 do not specifically refer to a fixed device. For example, the network side device may be a base station device of the access network device. The network side device may also be a base station device and a core network device of the access network device.

According to some embodiments, considering the efficiency of multi-system communication and linkage scheduling in the underground coal mines, the present disclosure may realize the mapping of service quality flow at a management entity end by supporting the aggregation of the logical entity of the second subsystem 121, thus realizing efficient interconnection and subsystem linkage.

In an embodiment of the present disclosure, the mining mobile communication system further has a seventh subsystem in response to determining that the mining mobile communication system adopts the data plane fusion architecture, and the seventh subsystem is configured to perform data plane fusion between subsystems, that is, perform protocol conversion, interaction, and joint transfer of functions of data between subsystems. The mining mobile communication system further has an eighth subsystem in response to determining that the mining mobile communication system adopts the control plane fusion architecture, and the eighth subsystem is configured to perform control plane fusion between subsystems, that is, perform protocol conversion, interaction, and joint transfer of functions of data between subsystems, and perform at least one operation of mapping services with subsystems, or allocating communication link resources, or allocating positioning link resource.

According to some embodiments, the mining mobile communication system may also have an eighth subsystem in response to determining that the mining mobile communication system adopts the hybrid fusion architecture. The mining mobile communication system may be configured to perform control plane fusion between subsystems according to the eighth subsystem, that is, perform protocol conversion, interaction, and joint transfer of functions of data between subsystems, and perform at least one operation of mapping services with subsystems, allocating communication link resources, or allocating positioning link resource.

In some embodiments, the granularity of the allocating communication link resources includes, but is not limited to a frequency band, a carrier, a partial bandwidth, a sub-channel, a resource block, a comb sub-channel, a comb resource block, a resource set, a resource pool and the like.

In an embodiment of the present disclosure, the eighth subsystem, when performing mapping the services with the subsystems or allocating the communication link resources, is configured to configure at least two service priorities, and allocate a link resource in a licensed frequency band for service data transmission in an order of priorities from high to low, allocate a link resource in an unlicensed frequency band for service data transmission, in response to determining that a proportion of an allocated link resource in the licensed frequency band is greater than or equal to a configured proportion value, and in response to determining that the proportion of the allocated link resource in the licensed frequency band is greater than or equal to the configured proportion value, and there is emergency service data to be transmitted transmit the emergency service data with an allocated resource not exceeding a configured emergency service maximum preemption resource threshold, and release the allocated resource not exceeding the configured emergency service maximum preemption resource threshold through a preempted terminal before a first time domain resource of the allocated resource is not less than a number of configured time domain resources, or directly transmit the emergency service data by using a resource in the unlicensed frequency band without pre-access monitoring, and carry information indicating the avoidance of the unlicensed frequency band in a system message in the licensed frequency band, and release the link resource in the unlicensed frequency band by a device receiving the system message in the licensed frequency band.

According to some embodiments, a configured proportion value Q is a ratio of a threshold in a network side configuration to a link resource value in the licensed frequency band. A range of the configured proportion value Q is $0<Q\leq1$. The link resource in the unlicensed frequency band may be allocated for service data transmission in the order of priorities from high to low, in response to determining that the proportion of the allocated link resource in the licensed frequency band to the link resource in the licensed frequency band is greater than or equal to the configured proportion value. Part of the link resource in the licensed frequency band may be reserved for sudden emergency service data by configuring the proportion value Q.

In some embodiments, the emergency service data refers to bursty high priority service data. The emergency service data does not specifically refer to a fixed data. The emergency service data includes, but is not limited to emergency avoidance data, emergency braking data of vehicle remote takeover, and the like.

According to some embodiments, a ratio of the emergency service maximum preemption resource threshold to the link resource value in the licensed frequency band is less than one. A sum of the emergency service maximum preemption resource threshold and the threshold in the network side configuration is not greater than the link resource in the licensed frequency band.

In some embodiments, the information indicating the avoidance of the unlicensed frequency band is carried in the system message in the licensed frequency band, and the link resource in the unlicensed frequency band is released by the device receiving the system message in the licensed frequency band. It may realize the rapid release of the resource in the unlicensed frequency band, and ensure the rapid and reliable transmission of emergency avoidance and highly secure control messages.

According to some embodiments, for a latency sensitive service near a terminal device in the underground, if the latency requirement is lower than the preset threshold, it is directly carried by the sidelink communication regardless of the priority, and lower end-to-end latency may be realized without going through a network.

In some embodiments, the latency sensitive service includes, but is not limited to collaborative control, emergency rescue information transmission, and the like.

According to some embodiments, the resource in the first frequency band is preferentially allocated for service data transmission in response to allocate the link resource in the licensed frequency band for service data transmission.

It is easy to understand that in the related art, merely a fixed subsystem may be supported to carry a fixed service, and dynamic scheduling of transmission links between different subsystems cannot be performed. That is, even if a most reliable licensed frequency band or a first frequency band on the licensed frequency band is idle, the services carried by the second subsystem 121 (such as WiFi) cannot be diverted to a more reliable licensed subsystem, and the optimal resource allocation and the most objective performance such as latency, reliability, rate, and the like cannot be realized. By adopting the eighth subsystem to map services with subsystems or allocate the communication link resources, the present disclosure may dynamically adjust resources based on a service transmission load, and may preferentially allocate the link resource in the licensed frequency band to a high priority service, such as a control services.

In an embodiment of the present disclosure, the eighth subsystem, when performing mapping the services with the subsystems or allocating the positioning link resources, is configured to configure a priority of a positioning service in at least one of configuring as a fixed service priority, configuring as a transmission priority of a supported communication service, or configuring as a highest priority, in an order of the priority of the positioning service from high to low, allocate the positioning link resources in any one of judging whether to allocate the link resource in the licensed frequency band as a transmission resource for a wireless positioning reference signal/information, in response to determining that a frequency domain resource bandwidth of the link resource in the licensed frequency band meets a positioning accuracy requirement, and a proportion of an allocated link resource in the licensed frequency band is less than or equal to a configured proportion value, taking the link resource in the licensed frequency band as the transmission resource for the wireless positioning reference signal/information, or taking the link resource in the unlicensed frequency band as the transmission resource of the wireless positioning reference signal/information, or judging whether to allocate the link resource in the licensed frequency band as a transmission resource for a wireless positioning reference signal/information, in response to determining that a frequency domain resource bandwidth of a link resource in the licensed frequency band meets a positioning accuracy requirement, and a proportion of an allocated link resource in the licensed frequency band is less than or equal to a configured proportion value, taking the link resource in the licensed frequency band as the transmission resource for the wireless positioning reference signal/information, otherwise, judging whether to allocate a frequency domain resource in a frequency band dedicated to sidelink communication as the transmission resource for the wireless positioning reference signal/information in response to determining that a frequency domain resource bandwidth of the frequency band dedicated to sidelink communication meets the positioning accuracy requirement, and a proportion of an allocated frequency domain resource of the frequency band dedicated to sidelink communication is less than or equal to a configured proportion value, taking the frequency domain resource in the frequency band dedicated to sidelink communication as the transmission resource for the wireless positioning reference signal/information, otherwise, taking the link resource in the unlicensed frequency band as the transmission resource for the wireless positioning reference signal/information.

In an embodiment of the present disclosure, in response to determining that the link resource in the unlicensed frequency band is taken as the transmission resource for the wireless positioning reference signal/information, the third subsystem 122 is configured to perform a positioning reference signal/information transmission device of the third subsystem 122 starting to monitor at least one unoccupied link resource in the licensed frequency band, in response to determining that occupied time of a link resource in any one occupied unlicensed frequency band reaches a configured remaining time threshold from an end moment of a preset channel occupied time (COT), after the positioning reference signal/information transmission device of the third subsystem 122 initially accesses the link resource in the unlicensed frequency band, the configured remaining time threshold being greater than or equal to W times of a minimum monitoring time before a preset unlicensed frequency band is accessed, where W is a positive integer and W is not less than 2, and accessing the positioning reference signal/information transmission device of the third subsystem 122 to at least one monitored link resource in the unoccupied unlicensed frequency band, in response to determining that occupied time of the occupied link resource in the unlicensed frequency band reaches the end moment of the preset channel occupied time. Therefore, it may be ensured that the positioning reference signal/information transmission device of the third subsystem 122 may be accessed to at least one monitored link resource in the unoccupied unlicensed frequency band at the end moment of the preset channel occupied time.

Taking a scenario as an example, when the first subsystem 110 is a 5GNR communication system, the licensed frequency band may provide a bandwidth of up to 100 MHz. At the same time, the transmission of wireless positioning signal/information on the licensed frequency band may ensure the low latency of positioning. Therefore, the resource in the licensed frequency band is preferentially provided for the transmission of positioning signal/information. In a case of insufficient licensed resources, a dedicated frequency band for the sidelink communication may ensure the low latency of positioning, but currently merely band47 70 MHz spectrum resources and 20 MHz dedicated resources are available. The subsequent spectrum allocation is to be determined. Whether it may meet the positioning accuracy/ranging accuracy index needs to be judged according to the specific positioning requirements. If so, the dedicated frequency band for the sidelink communication is preferentially allocated, so as to ensure low latency. If no, an unauthorized frequency band is used (specifically, frequency hopping may be used to realize continuous resource occupation in a time domain without being restricted by the COT), thus the low latency of positioning may be realized.

To sum up, the system provided in the embodiments of the present disclosure communicates in the licensed frequency band through the first subsystem. The present disclosure may improve the transmission efficiency, latency and reliability of the mining communication system.

In order to realize the above-mentioned embodiments, the present disclosure also provides a mining mobile communication method.

Figure 5:
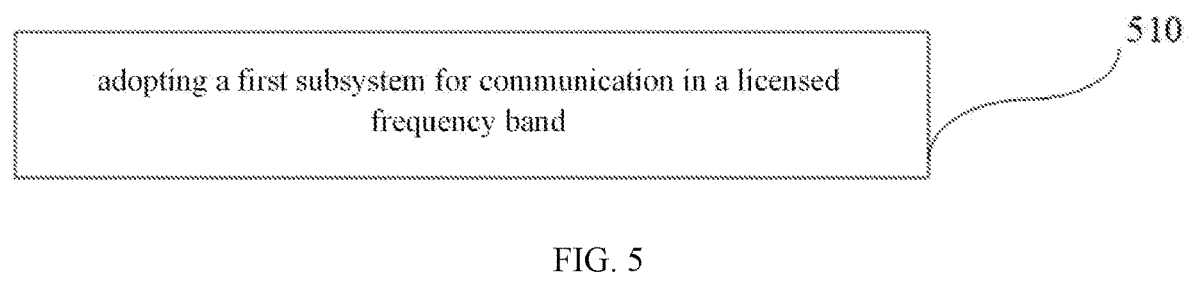

FIG. 5 is a flow chart showing a mining mobile communication method provided in an embodiment of the present disclosure.

As shown in FIG. 5, a mining mobile communication method includes step 510.

In step 510, a first subsystem is adopted for communication in a licensed frequency band.

In an embodiment of the present disclosure, the mining mobile communication method further includes adopting at least one of a subsystem set for communication. The subsystem set includes a second subsystem, a third subsystem, a fourth subsystem, a fifth subsystem, and a sixth subsystem.

The second subsystem is configured for communication in an unlicensed frequency band.

The third subsystem is configured for positioning.

The fourth subsystem is configured for sidelink communication.

The fifth subsystem is configured for broadcast communication.

The sixth subsystem configured for wireless communication in a licensed frequency band outside the licensed frequency band of the first subsystem.

In an embodiment of the present disclosure, the mining mobile communication method further includes adopting the first subsystem and the at least one of the subsystem set for communication. A technology adopted by the second subsystem includes at least one of first technologies for the second subsystem, and the first technologies for the second subsystem are technologies for a non-cellular technology system and include a WiFi technology based on a time division multiplexing (TDM) mode, a WiFi technology based on orthogonal frequency division multiplexing (OFDMA), a Bluetooth technology, and a SparkLink wireless communication technology. A technology adopted by the third subsystem includes at least one of first technologies for the third subsystem, and the first technologies for the third subsystem are technologies for a non-cellular technology system and include an ultra wide band (UWB) technology, a Zigbee technology, a sensing technology, and a radio frequency identification (RFID) technology. A technology adopted by the fourth subsystem includes at least one of first technologies for the fourth subsystem, and the first technologies for the fourth subsystem are technologies for a non-cellular technology system and include a WiFi technology, and a wireless intercom technology. A technology adopted by the fifth subsystem is a first technology for the fifth subsystem, and the first technology for the fifth subsystem is a technology for a non-cellular technology system and includes a digital cable broadcasting communication technology.

In an embodiment of the present disclosure, the mining mobile communication method further includes adopting the first subsystem and the at least one of the subsystem set for communication, and technologies adopted by all subsystems are technologies for cellular systems. A technology adopted by the second subsystem includes at least one of second technologies for the second subsystem, and the second technologies for the second subsystem are technologies for a cellular technology system and include a new radio access technology in an unlicensed frequency band (NR-U), and an unlicensed access technology for a sidelink communication (sidelink-U). A technology adopted by the third subsystem includes at least one of second technologies for the third subsystem, and the second technologies for the third subsystem are technologies for a cellular technology system and include a NR positioning technology, and a positioning technology based on a cellular sidelink communication. A technology adopted by the fourth subsystem is second technologies for the fourth subsystem, and the second technologies for the fourth subsystem are technologies for a cellular technology system and include a LTE sidelink communication technology, and a NR sidelink communication technology. A technology adopted by the fifth subsystem is second technologies for the fifth subsystem, and the second technologies for the fifth subsystem are technologies for a cellular technology system and include cellular multimedia broadcast multicast services (MBSs).

In an embodiment of the present disclosure, the mining mobile communication method further includes adopting the first subsystem and the at least one of the subsystem set for communication. A technology adopted by the second subsystem is at least one of a first technology for the second subsystem and a second technology for the second subsystem, and the first technology for the second subsystem is a technology for a non-cellular technology system and includes a WiFi technology based on a TDM mode, a WiFi technology based on OFDMA, a Bluetooth technology, and a SparkLink wireless communication technology; the second technology for the second subsystem is a technology for a cellular technology system and includes a NR-U and a Sidelink-U. A technology adopted by the third subsystem is at least one of a first technology for the third subsystem and a second technology for the third subsystem, and the first technology for the third subsystem is a technology for a non-cellular technology system and includes a UWB technology, a Zigbee technology, a sensing technology, and a RFID technology; the second technology for the third subsystem is a technology for a cellular technology system and includes a NR positioning technology, and a positioning technology based on a cellular sidelink communication. A technology adopted by the fourth subsystem is at least one of a first technology for the fourth subsystem and a second technology for the fourth subsystem, and the first technology for the fourth subsystem is a technology for a non-cellular technology system and includes a WiFi technology, and a wireless intercom technology; the second technology for the fourth subsystem is a technology for a cellular technology system and includes a LTE sidelink communication technology, and a NR sidelink communication technology. A technology adopted by the fifth subsystem is at least one of a first technology for the fifth subsystem and a second technology for the fifth subsystem, and the first technology for the fifth subsystem is a technology for a non-cellular technology system and includes a digital cable broadcast communication technology; the second technology for the fifth subsystem is a technology for a cellular technology system and includes cellular multimedia broadcast multicast services (MBSs). Subsystems of the mining mobile communication system adopt at least one of the first technology for the second subsystem, the first technology for the third subsystem, the first technology for the fourth subsystem and the first technology for the fifth subsystem, and adopt at least one of the second technology for the second subsystem, the second technology for the third subsystem, the second technology for the fourth subsystem and the second technology for the fifth subsystem.

In an embodiment of the present disclosure, the first subsystem, the third subsystem, and the fourth subsystem each include a network side device and a terminal device in response to determining that technologies adopted by the third subsystem and the fourth subsystem are both cellular system technologies. A deployment mode of the network side device of the first subsystem, the network side device of the third subsystem, and the network side device of the fourth subsystem is the network side device of the third subsystem, the network side device of the fourth subsystem, and the network side device of the first subsystem being deployed in a same physical entity, and a logical entity of the network side device of the third subsystem, a logical entity of the network side device of the fourth subsystem, and a logical entity of the network side device of the first subsystem being independent. A deployment mode of the terminal device of the first subsystem, the terminal device of the third subsystem, and the terminal device of the fourth subsystem is any one of at least two of the terminal device of the third subsystem, the terminal device of the fourth subsystem and the terminal device of the first subsystem being deployed in a same physical entity, and a logical entity of the terminal device of the third subsystem, a logical entity of the terminal device of the fourth subsystem and a logical entity of the terminal device of the first subsystem being independent, or physical and logical entities of the terminal device of the third subsystem, the terminal device of the fourth subsystem, and the terminal device of the first subsystem being independent.

In an embodiment of the present disclosure, the first subsystem, the second subsystem, and the fifth subsystem each include a network side device and a terminal device in response to determining that technologies adopted by the second subsystem and the fifth subsystem are both cellular system technologies. A deployment mode of the network side device of the first subsystem, the network side device of the second subsystem, and the network side device of the fifth subsystem is any one of the network side device of the second subsystem, the network side device of the fifth subsystem, and the network side device of the first subsystem being deployed in a same physical entity, and a logical entity of the network side device of the second subsystem, a logical entity of the network side device of the fifth subsystem, and a logical entity of the network side device of the first subsystem being independent, or the network side device of the second subsystem, the network side device of the fifth subsystem, and the network side device of the first subsystem being deployed in a same physical entity, and a logical entity of the network side device of the second subsystem, a logical entity of the network side device of the fifth subsystem, and a logical entity of the network side device of the first subsystem being a same logical entity. A deployment mode of the terminal device of the first subsystem, the terminal device of the second subsystem, and the terminal device of the fifth subsystem is any one of the terminal device of the second subsystem, the terminal device of the fifth subsystem, and the terminal device of the first subsystem being deployed in a same physical entity, and a logical entity of the terminal device of the second subsystem, a logical entity of the terminal device of the fifth subsystem, and a logical entity of the terminal device of the first subsystem being independent; a physical entity of the terminal device of the second subsystem, a physical entity of the terminal device of the fifth subsystem, and a physical entity of the terminal device of the first subsystem being independent, and a logical entity of the terminal device of the second subsystem, a logical entity of the terminal device of the fifth subsystem, and a logical entity of the terminal device of the first subsystem being independent; or the terminal device of the second subsystem, the terminal device of the fifth subsystem, and the terminal device of the first subsystem being deployed in a same physical entity, and a logical entity of the terminal device of the second subsystem, a logical entity of the terminal device of the fifth subsystem, and a logical entity of the terminal device of the first subsystem being a same logical entity.

In an embodiment of the present disclosure, the mining mobile communication method further includes adopting any one of a data plane fusion architecture, a control plane fusion architecture, or a hybrid fusion architecture when communicating. If the data plane fusion architecture is adopted for communication, data plane fusion between subsystems is performed according to a seventh subsystem, that is, protocol conversion, interaction, and joint transfer of functions of data between subsystems is performed. If the control plane fusion architecture is adopted for communication, control plane fusion between subsystems is performed according to an eighth subsystem, that is, protocol conversion, interaction, and joint transfer of functions of data between subsystems is performed, and at least one operation of mapping services with subsystems, allocating communication link resources, or allocating positioning link resources is performed. The hybrid fusion architecture is composed of the data plane fusion architecture and the control plane fusion architecture.

In an embodiment of the present disclosure, the control plane fusion between subsystems being performed according to the eighth subsystem, that is, the protocol conversion, interaction, and joint transfer of functions of data between subsystems being performed, and the at least one operation of mapping services with subsystems, allocating communication link resources, or allocating positioning link resources being performed includes configuring at least two service priorities, and allocating a link resource in a licensed frequency band for service data transmission in an order of priorities from high to low; allocating a link resource in an unlicensed frequency band for service data transmission, in response to determining that a proportion of an allocated link resource in the licensed frequency band is greater than or equal to a configured proportion value; and in response to determining that the proportion of the allocated link resource in the licensed frequency band is greater than or equal to the configured proportion value, and there is emergency service data to be transmitted transmitting the emergency service data with an allocated resource not exceeding a configured emergency service maximum preemption resource threshold, and releasing the allocated resource not exceeding the configured emergency service maximum preemption resource threshold through a preempted terminal before a first time domain resource of the allocated resource is not less than a number of configured time domain resources; or directly transmitting the emergency service data by using a resource in the unlicensed frequency band without pre-access monitoring, and carrying information indicating the avoidance of the unlicensed frequency band in a system message in the licensed frequency band, and releasing the link resource in the unlicensed frequency band by a device receiving the system message in the licensed frequency band.

In an embodiment of the present disclosure, the control plane fusion between subsystems being performed according to the eighth subsystem, that is, the protocol conversion, interaction, and joint transfer of functions of data between subsystems being performed, and the at least one operation of mapping services with subsystems, allocating communication link resources, or allocating positioning link resources being performed includes configuring a priority of a positioning service in at least one of configured as a fixed service priority; configured as a transmission priority of a supported communication service; or configured as a highest priority; in an order of the priority of the positioning service from high to low, allocating the positioning link resources in any one of judging whether to allocate the link resource in the licensed frequency band as a transmission resource for a wireless positioning reference signal/information; in response to determining that a frequency domain resource bandwidth of the link resource in the licensed frequency band meets a positioning accuracy requirement, and a proportion of an allocated link resource in the licensed frequency band is less than or equal to a configured proportion value, taking the link resource in the licensed frequency band as the transmission resource for the wireless positioning reference signal/information; or taking the link resource in the unlicensed frequency band as the transmission resource of the wireless positioning reference signal/information; or judging whether to allocate the link resource in the licensed frequency band as a transmission resource for a wireless positioning reference signal/information; in response to determining that a frequency domain resource bandwidth of a link resource in the licensed frequency band meets a positioning accuracy requirement, and a proportion of an allocated link resource in the licensed frequency band is less than or equal to a configured proportion value, taking the link resource in the licensed frequency band as the transmission resource for the wireless positioning reference signal/information; otherwise, judging whether to allocate a frequency domain resource in a frequency band dedicated to sidelink communication as the transmission resource for the wireless positioning reference signal/information in response to determining that a frequency domain resource bandwidth of the frequency band dedicated to sidelink communication meets the positioning accuracy requirement, and a proportion of an allocated frequency domain resource of the frequency band dedicated to sidelink communication is less than or equal to a configured proportion value, taking the frequency domain resource in the frequency band dedicated to sidelink communication as the transmission resource for the wireless positioning reference signal/information; otherwise, taking the link resource in the unlicensed frequency band as the transmission resource for the wireless positioning reference signal/information.

In an embodiment of the present disclosure, taking the link resource in the unlicensed frequency band as the transmission resource for the wireless positioning reference signal/information includes a positioning reference signal/information transmission device of the third subsystem starting to monitor at least one unoccupied link resource in the licensed frequency band, in response to determining that occupied time of a link resource in any one occupied unlicensed frequency band reaches a configured remaining time threshold from an end moment of a preset channel occupied time, after the positioning reference signal/information transmission device of the third subsystem initially accesses the link resource in the unlicensed frequency band; the configured remaining time threshold being greater than or equal to W times of a minimum monitoring time before a preset unlicensed frequency band is accessed, where W is a positive integer and W is not less than 2; and accessing the positioning reference signal/information transmission device of the third subsystem to at least one monitored link resource in the unoccupied unlicensed frequency band, in response to determining that occupied time of the occupied link resource in the unlicensed frequency band reaches the end moment of the preset channel occupied time.

In an embodiment of the present disclosure, when the first subsystem is adopted for communication in the licensed frequency band, the first subsystem includes a core network device, a transmission network, and an access network device.

In an embodiment of the present disclosure, a deployment architecture of the core network device is any one of a core network server being deployed in a device room of a first level, and a user plane function (UPF) being deployed in a device room of a second level; both a core network server and a UPF being deployed in a device room of a first level; or both a core network server and a UPF being deployed in a device room of a second level; in which the device room of the first level connects and manages a plurality of device rooms of the second level, and the device room of the second level is a device room that merely connects and manages a single mine underground transmission network and a single access network device.

In an embodiment of the present disclosure, the access network device includes a base station device and a terminal device, or includes a base station device, a terminal device and a reconfigurable intelligent hypersurface device, and the access network device is configured to use at least one licensed frequency band for data transmission.

In an embodiment of the present disclosure, the base station device includes a baseband processing unit, a radio remote unit, or includes a baseband processing unit, a radio remote unit, and a hub.

In an embodiment of the present disclosure, the terminal device includes at least one of a handheld terminal, a vehicle terminal, a customer premise device (CPE), a reduced capability (RedCap) terminal, or a sensor with a wireless transmission function.

In an embodiment of the present disclosure, the access network device is configured to use at least one first frequency band for data transmission or at least one second frequency band for data transmission in an area with a coverage enhancement requirement, in which the first frequency band is a frequency band less than or equal to a pre-configured frequency threshold, and the second frequency band is a combination of the first frequency band and a third frequency band, and a frequency band of the first frequency band and a frequency band of the third frequency band are different.

In an embodiment of the present disclosure, the access network device is configured to use at least one first frequency band for data transmission or at least one second frequency band for data transmission, and a trigger condition is determined based on first information, in which the first information includes at least one of underground environment information, an underground base station layout parameter, and underground wireless environment status information. When the first information is the underground environment information, the trigger condition is a working environment of the mining mobile communication system being located in a first area, or the mining mobile communication system transmitting system disaster warning information, environmental parameter warning information, or emergency evacuation information. When the first information is the underground station layout parameter, the trigger condition is an underground station layout distance being greater than or equal to a preset threshold. When the first information is the underground wireless environment status information, the trigger condition includes at least one of reaching or exceeding a preset duration threshold, and no synchronization signal or system information being searched; reaching or exceeding a preset number of times, random access being not successfully completed, or a radio resource control (RRC) parameter being not acquired; within a preset length of time, a proportion of a number of times reference signal receiving power (RSRP) of a signal transmission is lower than or equal to a preset RSRP threshold reaching or exceeding a preset proportion, or a ratio of a number of times a signal to interference plus noise ratio (SINR) of a signal transmission is lower than or equal to a preset SINR threshold reaching or exceeding a preset ratio; or within a preset time or a preset number of transmissions, a counting value of a transmission number evaluation counter reaching a preset value, and the transmission number evaluation counter being configured to evaluate a status of the underground wireless environment according to a number of times of reception of a negative-acknowledgment (NACK) or a number of times of retransmission by a transmission block of a same service or a code block group of a same service.

In an embodiment of the present disclosure, the transmission number evaluation counter being configured to evaluate the status of the underground wireless environment according to the number of times of reception of the negative-acknowledgment (NACK) or the number of times of retransmission by the transmission block of the same service or the code block group of the same service includes adding a transmission number evaluation indication field in reserved bits of a physical layer signaling or high layer signaling of the mining mobile communication system to indicate that it is currently required to start the transmission number evaluation. The transmission number evaluation indication field indicates that one transmission number evaluation is currently started, and a transmission number evaluation count value is randomly generated within a preset numerical range, and current transmission number evaluation time is randomly generated within a preset time range when meeting at least one of the network side indicating to start one transmission number evaluation; a time for which a transmission is not performed by using the first frequency band or the second frequency band reaching or exceeding a preset duration; a time from a starting time of a last transmission number evaluation reaching or exceeding last randomly generated transmission number evaluation time; a random number of a transmission number evaluation which is not performed currently, a transmission being about to be performed and a randomly generated transmission number evaluation being within a random number interval that determines to perform the transmission number evaluation; or a count value of the transmission number evaluation counter reaching a preset value. After the transmission number evaluation is started, in response to determining that the number of transmissions meets a preset condition, the count value of the transmission number evaluation counter is subtracted by one, and the preset condition is a transmission block of a service packet or a code block group of a service packet receiving the NACK for a preset number of times, or retransmitting for a preset number of times.

To sum up, the method provided in the embodiments of the present disclosure adopts the first subsystem for communication in the licensed frequency band. The present disclosure may improve the transmission efficiency, latency and reliability of the mining communication system.

In order to realize the above-mentioned embodiments, the present disclosure also provides an electronic device. The electronic device includes a processor; and a memory for storing instructions executable by the processor; in which the processor is configured to execute the instructions to implement the mining mobile communication method according to the embodiment of the present disclosure.

In order to realize the above embodiments, the present disclosure also provides a computer-readable storage medium. The computer-readable storage medium having stored therein computer programs that, when executed by a processor, cause the mining mobile communication method according to the embodiment of the present disclosure to be implemented.

In order to realize the above embodiments, the present disclosure also provides a computer program product. The computer program product including a computer program that, when executed by a processor, causes the mining mobile communication method according to the embodiment of the present disclosure to be implemented.

It is to be noted that in the description of the present disclosure, terms such as "first" and "second" are merely used for purposes of description, and cannot be construed as indicating or implying relative importance. In addition, in the description of the present disclosure, "a plurality of" means two or more, unless specified otherwise.

Any process or method described in a flow chart or described herein in other ways may be understood to include one or more modules, segments or portions of codes of executable instructions for achieving specific logical functions or steps in the process. The scope of a preferred embodiment of the present disclosure includes other implementations, where functions may be performed out of the order shown or discussed, including in a substantially simultaneous manner or in a reverse order according to the functions involved, which should be understood by those skilled in the art to which the embodiments of the present disclosure belong.

It is to be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to terms "an embodiment", "some embodiments", "an example", "a specific example", or "some examples", etc., means that a particular feature, structure, material, or characteristic described in connection with the embodiment or example is included in at least one embodiment or example of the present disclosure. Schematic expressions of the above terms throughout this specification are not necessarily referring to the same embodiment or example. Furthermore, the particular features, structures, materials, or characteristics described may be combined in any suitable manner in one or more embodiments or examples.

Although embodiments of the present disclosure have been shown and described above, it is appreciated that the above embodiments are illustrative and cannot be construed to limit the present disclosure, and variations, modifications, replacements and variants of the above embodiments can be made by those skilled in the art within the scope of the present disclosure.

What is claimed is:

1. A mining mobile communication system, comprising:
a first subsystem configured for communication in a licensed frequency band;
wherein the first subsystem comprises a core network device, a transmission network, and an access network device;
wherein the access network device comprises a base station device and a terminal device, or comprises a base station device, a terminal device and a reconfigurable intelligent hypersurface device; and the access network device is configured to use at least one licensed frequency band for data transmission, and
wherein a deployment architecture of the core network device is any one of:
a core network server being deployed in a device room of a first level, and a user plane function (UPF) being deployed in a device room of a second level;
both a core network server and a UPF being deployed in a device room of a first level; or
both a core network server and a UPF being deployed in a device room of a second level;
wherein the device room of the first level connects and manages a plurality of device rooms of the second level, and the device room of the second level is a device room that merely connects and manages a single mine underground transmission network and a single access network device.

2. The system of claim 1, wherein the mining mobile communication system further comprises at least one subsystem set, and the subsystem set comprises:
a second subsystem configured for communication in an unlicensed frequency band;
a third subsystem configured for positioning;
a fourth subsystem configured for sidelink communication;
a fifth subsystem configured for broadcast communication; and
a sixth subsystem configured for wireless communication in a licensed frequency band outside the licensed frequency band of the first subsystem.

3. The system of claim 2, wherein the mining mobile communication system comprises the first subsystem and the at least one subsystem set; wherein
a technology adopted by the second subsystem comprises at least one of first technologies for the second subsystem, and the first technologies for the second subsystem are technologies for a non-cellular technology system and comprise: a WiFi technology based on a time division multiplexing (TDM) mode, a WiFi technology based on orthogonal frequency division multiplexing (OFDMA), a Bluetooth technology, and a SparkLink wireless communication technology;
a technology adopted by the third subsystem comprises at least one of first technologies for the third subsystem, and the first technologies for the third subsystem are technologies for a non-cellular technology system and comprise: an ultra wide band (UWB) technology, a Zigbee technology, a sensing technology, and a radio frequency identification (RFID) technology;
a technology adopted by the fourth subsystem comprises at least one of first technologies for the fourth subsystem, and the first technologies for the fourth subsystem are technologies for a non-cellular technology system and comprise: a WiFi technology, and a wireless intercom technology; and a technology adopted by the fifth subsystem is a first technology for the fifth subsystem, and the first technology for the fifth subsystem is a technology for a non-cellular technology system and comprises a digital cable broadcasting communication technology.

4. The system of claim 2, wherein the mining mobile communication system comprises the first subsystem and the at least one subsystem set, and technologies adopted by all subsystems are technologies for cellular systems; wherein
a technology adopted by the second subsystem comprises at least one of second technologies for the second subsystem, and the second technologies for the second subsystem are technologies for a cellular technology system and comprise: a new radio access technology in an unlicensed frequency band (NR-U), and an unlicensed access technology for a sidelink communication (sidelink-U);
a technology adopted by the third subsystem comprises at least one of second technologies for the third subsystem, and the second technologies for the third subsystem are technologies for a cellular technology system and comprise: a NR positioning technology, and a positioning technology based on a cellular sidelink communication;
a technology adopted by the fourth subsystem is second technologies for the fourth subsystem, and the second technologies for the fourth subsystem are technologies for a cellular technology system and comprise a LTE sidelink communication technology, and a NR sidelink communication technology; and
a technology adopted by the fifth subsystem is second technologies for the fifth subsystem, and the second technologies for the fifth subsystem are technologies for a cellular technology system and comprise cellular multimedia broadcast multicast services (MBSs).

5. The system of claim 2, wherein the mining mobile communication comprises the first subsystem and the at least one subsystem set; wherein
a technology adopted by the second subsystem is at least one of a first technology for the second subsystem and a second technology for the second subsystem, and the first technology for the second subsystem is a technology for a non-cellular technology system and comprises: a WiFi technology based on a TDM mode, a WiFi technology based on OFDMA, a Bluetooth technology, and a SparkLink wireless communication technology; the second technology for the second subsystem is a technology for a cellular technology system and comprises a NR-U and a Sidelink-U;
a technology adopted by the third subsystem is at least one of a first technology for the third subsystem and a second technology for the third subsystem, and the first technology for the third subsystem is a technology for a non-cellular technology system and comprises: a UWB technology, a Zigbee technology, a sensing technology, and a RFID technology; the second technology for the third subsystem is a technology for a cellular technology system and comprises: a NR positioning technology, and a positioning technology based on a cellular sidelink communication;
a technology adopted by the fourth subsystem is at least one of a first technology for the fourth subsystem and a second technology for the fourth subsystem, and the first technology for the fourth subsystem is a technology for a non-cellular technology system and comprises a WiFi technology, and a wireless intercom technology; the second technology for the fourth subsystem is a technology for a cellular technology system and comprises a LTE sidelink communication technology, and a NR sidelink communication technology;

a technology adopted by the fifth subsystem is at least one of a first technology for the fifth subsystem and a second technology for the fifth subsystem, and the first technology for the fifth subsystem is a technology for a non-cellular technology system and comprises a digital cable broadcast communication technology; the second technology for the fifth subsystem is a technology for a cellular technology system and comprises cellular multimedia broadcast multicast services (MBSs); and subsystems of the mining mobile communication system adopt at least one of the first technology for the second subsystem, the first technology for the third subsystem, the first technology for the fourth subsystem and the first technology for the fifth subsystem, and adopt at least one of the second technology for the second subsystem, the second technology for the third subsystem, the second technology for the fourth subsystem and the second technology for the fifth subsystem.

6. The system of claim 4, wherein the first subsystem, the third subsystem, and the fourth subsystem each comprise a network side device and a terminal device in response to determining that technologies adopted by the third subsystem and the fourth subsystem are both cellular system technologies; wherein a deployment mode of the network side device of the first subsystem, the network side device of the third subsystem, and the network side device of the fourth subsystem is:

the network side device of the third subsystem, the network side device of the fourth subsystem, and the network side device of the first subsystem being deployed in a same physical entity, and a logical entity of the network side device of the third subsystem, a logical entity of the network side device of the fourth subsystem, and a logical entity of the network side device of the first subsystem being independent; and a deployment mode of the terminal device of the first subsystem, the terminal device of the third subsystem, and the terminal device of the fourth subsystem is any one of:

at least two of the terminal device of the third subsystem, the terminal device of the fourth subsystem and the terminal device of the first subsystem being deployed in a same physical entity, and a logical entity of the terminal device of the third subsystem, a logical entity of the terminal device of the fourth subsystem and a logical entity of the terminal device of the first subsystem being independent; or physical and logical entities of the terminal device of the third subsystem, the terminal device of the fourth subsystem, and the terminal device of the first subsystem being independent.

7. The system of claim 4, wherein the first subsystem, the second subsystem, and the fifth subsystem each comprise a network side device and a terminal device in response to determining that technologies adopted by the second subsystem and the fifth subsystem are both cellular system technologies;

a deployment mode of the network side device of the first subsystem, the network side device of the second subsystem, and the network side device of the fifth subsystem is any one of:

the network side device of the second subsystem, the network side device of the fifth subsystem, and the network side device of the first subsystem being deployed in a same physical entity, and a logical entity of the network side device of the second subsystem, a logical entity of the network side device of the fifth subsystem, and a logical entity of the network side device of the first subsystem being independent; or the network side device of the second subsystem, the network side device of the fifth subsystem, and the network side device of the first subsystem being deployed in a same physical entity, and a logical entity of the network side device of the second subsystem, a logical entity of the network side device of the fifth subsystem, and a logical entity of the network side device of the first subsystem being a same logical entity;

a deployment mode of the terminal device of the first subsystem, the terminal device of the second subsystem, and the terminal device of the fifth subsystem is any one of:

the terminal device of the second subsystem, the terminal device of the fifth subsystem, and the terminal device of the first subsystem being deployed in a same physical entity, and a logical entity of the terminal device of the second subsystem, a logical entity of the terminal device of the fifth subsystem, and a logical entity of the terminal device of the first subsystem being independent;

a physical entity of the terminal device of the second subsystem, a physical entity of the terminal device of the fifth subsystem, and a physical entity of the terminal device of the first subsystem being independent, and a logical entity of the terminal device of the second subsystem, a logical entity of the terminal device of the fifth subsystem, and a logical entity of the terminal device of the first subsystem being independent; or the terminal device of the second subsystem, the terminal device of the fifth subsystem, and the terminal device of the first subsystem being deployed in a same physical entity, and a logical entity of the terminal device of the second subsystem, a logical entity of the terminal device of the fifth subsystem, and a logical entity of the terminal device of the first subsystem being a same logical entity.

8. The system of claim 2, wherein the mining mobile communication system performs networking according to any one of a data plane fusion architecture, a control plane fusion architecture, or a hybrid fusion architecture; wherein the mining mobile communication system further has a seventh subsystem in response to determining that the mining mobile communication system adopts the data plane fusion architecture, and the seventh subsystem is configured to perform data plane fusion between subsystems, that is, perform protocol conversion, interaction, and joint transfer of functions of data between subsystems;

the mining mobile communication system further has an eighth subsystem in response to determining that the mining mobile communication system adopts the control plane fusion architecture, and the eighth subsystem is configured to perform control plane fusion between subsystems, that is, perform protocol conversion, interaction, and joint transfer of functions of data between subsystems, and perform at least one operation of mapping services with subsystems, allocating commu-
nication link resources, or allocating positioning link
resources; and the hybrid fusion architecture is composed of the data
plane fusion architecture and the control plane fusion
architecture.

9. The system of claim 8, wherein the eighth subsystem,
when performing mapping the services with the subsystems
or allocating the communication link resources, is config-
ured to:

configure at least two service priorities, and allocate a link
resource in a licensed frequency band for service data
transmission in an order of priorities from high to low;

allocate a link resource in an unlicensed frequency band
for service data transmission, in response to determin-
ing that a proportion of an allocated link resource in the
licensed frequency band is greater than or equal to a
configured proportion value; and in response to determining that the proportion of the
allocated link resource in the licensed frequency band
is greater than or equal to the configured proportion
value, and there is emergency service data to be trans-
mitted:

transmit the emergency service data with an allocated
resource not exceeding a configured emergency service
maximum preemption resource threshold, and release
the allocated resource not exceeding the configured
emergency service maximum preemption resource
threshold through a preempted terminal before a first
time domain resource of the allocated resource is not
less than a number of configured time domain
resources; or directly transmit the emergency service data by using a
resource in the unlicensed frequency band without
pre-access monitoring, and carry information indicat-
ing the avoidance of the unlicensed frequency band in
a system message in the licensed frequency band, and
release the link resource in the unlicensed frequency
band by a device receiving the system message in the
licensed frequency band.

10. The system of claim 8, wherein the eighth subsystem,
when performing mapping the services with the subsystems
or allocating the positioning link resources, is configured to:

configure a priority of a positioning service in at least one
of:

configuring as a fixed service priority;

configuring as a transmission priority of a supported
communication service; or configuring as a highest priority;

in an order of the priority of the positioning service from
high to low, allocate the positioning link resources in
any one of:

judging whether to allocate the link resource in the
licensed frequency band as a transmission resource for
a wireless positioning reference signal/information;

in response to determining that a frequency domain
resource bandwidth of the link resource in the licensed
frequency band meets a positioning accuracy require-
ment, and a proportion of an allocated link resource in
the licensed frequency band is less than or equal to a
configured proportion value, taking the link resource in
the licensed frequency band as the transmission
resource for the wireless positioning reference signal/
information; or taking the link resource in the unli-
censed frequency band as the transmission resource of
the wireless positioning reference signal/information;

or judging whether to allocate the link resource in the
licensed frequency band as a transmission resource for
a wireless positioning reference signal/information;

in response to determining that a frequency domain
resource bandwidth of a link resource in the licensed
frequency band meets a positioning accuracy require-
ment, and a proportion of an allocated link resource in
the licensed frequency band is less than or equal to a
configured proportion value, taking the link resource in
the licensed frequency band as the transmission
resource for the wireless positioning reference signal/
information; otherwise, judging whether to allocate a
frequency domain resource in a frequency band dedi-
cated to sidelink communication as the transmission
resource for the wireless positioning reference signal/
information:

in response to determining that a frequency domain
resource bandwidth of the frequency band dedicated to
sidelink communication meets the positioning accuracy
requirement, and a proportion of an allocated frequency
domain resource of the frequency band dedicated to
sidelink communication is less than or equal to a
configured proportion value, taking the frequency
domain resource in the frequency band dedicated to
sidelink communication as the transmission resource
for the wireless positioning reference signal/informa-
tion; otherwise, taking the link resource in the unli-
censed frequency band as the transmission resource for
the wireless positioning reference signal/information.

11. The system of claim 10, wherein in response to
determining that the link resource in the unlicensed fre-
quency band is taken as the transmission resource for the
wireless positioning reference signal/information, the third
subsystem is configured to perform:

a positioning reference signal/information transmission
device of the third subsystem starting to monitor at
least one unoccupied link resource in the licensed
frequency band, in response to determining that occu-
pied time of a link resource in any one occupied
unlicensed frequency band reaches a configured
remaining time threshold from an end moment of a
preset channel occupied time, after the positioning
reference signal/information transmission device of the
third subsystem initially accesses the link resource in
the unlicensed frequency band;

the configured remaining time threshold being greater
than or equal to W times of a minimum monitoring time
before a preset unlicensed frequency band is accessed,
where W is a positive integer and W is not less than 2;
and accessing the positioning reference signal/information
transmission device of the third subsystem to at least
one monitored link resource in the unoccupied unli-
censed frequency band, in response to determining that
occupied time of the occupied link resource in the
unlicensed frequency band reaches the end moment of
the preset channel occupied time.

12. The system of claim 1, wherein the access network
device is configured to use at least one first frequency band
for data transmission or at least one second frequency band
for data transmission in an area with a coverage enhance-
ment requirement;

wherein the first frequency band is a frequency band less
than or equal to a pre-configured frequency threshold;
and the second frequency band is a combination of the first frequency band and a third frequency band, and a frequency band of the first frequency band and a frequency band of the third frequency band are different.

13. The system of claim 12, wherein the access network device is configured to use at least one first frequency band for data transmission or at least one second frequency band for data transmission, and a trigger condition is determined based on first information, wherein the first information comprises at least one of underground environment information, an underground base station layout parameter, and underground wireless environment status information;

when the first information is the underground environment information, the trigger condition is a working environment of the mining mobile communication system being located in a first area, or the mining mobile communication system transmitting system disaster warning information, environmental parameter warning information, or emergency evacuation information;

when the first information is the underground station layout parameter, the trigger condition is an underground station layout distance being greater than or equal to a preset threshold; and when the first information is the underground wireless environment status information, the trigger condition comprises at least one of:

reaching or exceeding a preset duration threshold, and no synchronization signal or system information being searched;

reaching or exceeding a preset number of times, random access being not successfully completed, or a radio resource control (RRC) parameter being not acquired;

within a preset length of time, a proportion of a number of times reference signal receiving power (RSRP) of a signal transmission is lower than or equal to a preset RSRP threshold reaching or exceeding a preset proportion, or a ratio of a number of times a signal to interference plus noise ratio (SINR) of a signal transmission is lower than or equal to a preset SINR threshold reaching or exceeding a preset ratio; or within a preset time or a preset number of transmissions, a counting value of a transmission number evaluation counter reaching a preset value, and the transmission number evaluation counter being configured to evaluate a status of the underground wireless environment according to a number of times of reception of a negative-acknowledgment (NACK) or a number of times of retransmission by a transmission block of a same service or a code block group of a same service.

14. The system of claim 13, wherein the transmission number evaluation counter being configured to evaluate the status of the underground wireless environment according to the number of times of reception of the NACK or the number of times of retransmission by the transmission block of the same service or the code block group of the same service is specifically:

adding a transmission number evaluation indication field in reserved bits of a physical layer signaling or high layer signaling of the mining mobile communication system to indicate that it is currently required to start the transmission number evaluation;

the transmission number evaluation indication field indicating that one transmission number evaluation is currently started, and a transmission number evaluation count value being randomly generated within a preset numerical range, and current transmission number evaluation time being randomly generated within a preset time range when meeting at least one of:

the network side indicating to start one transmission number evaluation;

a time for which a transmission is not performed by using the first frequency band or the second frequency band reaching or exceeding a preset duration;

a time from a starting time of a last transmission number evaluation reaching or exceeding last randomly generated transmission number evaluation time;

a random number of a transmission number evaluation which is not performed currently, a transmission being about to be performed and a randomly generated transmission number evaluation being within a random number interval that determines to perform the transmission number evaluation; or a count value of the transmission number evaluation counter reaching a preset value;

after the transmission number evaluation is started, in response to determining that the number of transmissions meets a preset condition, the count value of the transmission number evaluation counter being subtracted by one, and the preset condition being:

a transmission block of a service packet or a code block group of a service packet receiving the NACK for a preset number of times, or retransmitting for a preset number of times.

15. A mining mobile communication method, comprising:

adopting a first subsystem for communication in a licensed frequency band;

wherein the first subsystem comprises a core network device, a transmission network, and an access network device;

wherein the access network device comprises a base station device and a terminal device, or comprises a base station device, a terminal device and a reconfigurable intelligent hypersurface device; and the access network device is configured to use at least one licensed frequency band for data transmission, and wherein a deployment architecture of the core network device is any one of:

a core network server being deployed in a device room of a first level, and a user plane function (UPF) being deployed in a device room of a second level;

both a core network server and a UPF being deployed in a device room of a first level; or both a core network server and a UPF being deployed in a device room of a second level;

wherein the device room of the first level connects and manages a plurality of device rooms of the second level, and the device room of the second level is a device room that merely connects and manages a single mine underground transmission network and a single access network device.

16. The mining mobile communication method of claim 15, further comprising:

adopting at least one subsystem set for communication, wherein the subsystem set comprises:

a second subsystem configured for communication in an unlicensed frequency band;

a third subsystem configured for positioning;

a fourth subsystem configured for sidelink communication;

a fifth subsystem configured for broadcast communication; and a sixth subsystem configured for wireless communication in a licensed frequency band outside the licensed frequency band of the first subsystem.

17. An electronic device, comprising:

a processor; and a memory for storing instructions executable by the processor;

wherein the processor is configured to adopt a first subsystem for communication in a licensed frequency band;

wherein the first subsystem comprises a core network device, a transmission network, and an access network device;

wherein the access network device comprises a base station device and a terminal device, or comprises a base station device, a terminal device and a reconfigurable intelligent hypersurface device; and the access network device is configured to use at least one licensed frequency band for data transmission, and wherein a deployment architecture of the core network device is any one of:

a core network server being deployed in a device room of a first level, and a user plane function (UPF) being deployed in a device room of a second level;

both a core network server and a UPF being deployed in a device room of a first level; or both a core network server and a UPF being deployed in a device room of a second level;

wherein the device room of the first level connects and manages a plurality of device rooms of the second level, and the device room of the second level is a device room that merely connects and manages a single mine underground transmission network and a single access network device.

* * * * *